United States Patent [19]

Fiorucci

[11] 4,430,241

[45] Feb. 7, 1984

[54] MIXED NITRATE SALT HEAT TRANSFER MEDIUM AND PROCESS FOR PROVIDING THE SAME

[75] Inventor: Louis C. Fiorucci, Hamden, Conn.

[73] Assignee: Olin Corporation, New Haven, Conn.

[21] Appl. No.: 394,192

[22] Filed: Jul. 1, 1982

[51] Int. Cl.³ .................................................. C09K 5/06
[52] U.S. Cl. .................................. 252/70; 23/293 R; 23/293 A; 23/302 T; 23/313 FB; 423/182; 423/183; 423/201; 423/395; 423/641; 423/659; 71/58; 71/59; 264/3 C; 264/3 D; 149/41; 149/61
[58] Field of Search ........... 252/70; 23/293 R, 293 A, 23/302 T, 313 FB; 423/182, 183, 201, 395, 641, 659; 71/58, 59; 264/3 C, 3 D; 149/41, 46

[56] References Cited

U.S. PATENT DOCUMENTS

| | | | |
|---|---|---|---|
| 1,937,757 | 12/1933 | Gleason | 23/293 A |
| 2,635,945 | 4/1953 | Pike | 71/59 |
| 2,643,180 | 6/1953 | Miller | 423/395 |
| 2,773,753 | 12/1956 | Stengel | 71/58 |
| 2,782,094 | 2/1957 | Ames | 423/268 |
| 2,782,095 | 2/1957 | Ames | 423/274 |
| 3,361,522 | 1/1968 | Flatt | 423/397 |

FOREIGN PATENT DOCUMENTS

| | | | |
|---|---|---|---|
| 53-14785 | 5/1978 | Japan | 252/70 |

*Primary Examiner*—John E. Kittle
*Assistant Examiner*—Robert A. Wax
*Attorney, Agent, or Firm*—Arthur E. Oaks; Donald F. Clements

[57] ABSTRACT

A process for producing particles of a non-friable eutectic mixture of sodium nitrate and potassium nitrate for solar power station use is disclosed. In one embodiment of the invention, the particles are produced by shock chilling a molten stream of mixed nitrate material and crushing the resulting flakes to a size range of between about $-5$ mesh and about $+30$ mesh. In a second embodiment, particles of this size are produced by spray granulation of a concentrated solution of mixed nitrate salts onto a fluidized bed to produce dry, free-flowing, solid spheres. In both embodiments, the particles are extremely hard, resistant to moisture pickup and adaptable to being readily shipped by bulk containers.

25 Claims, 2 Drawing Figures

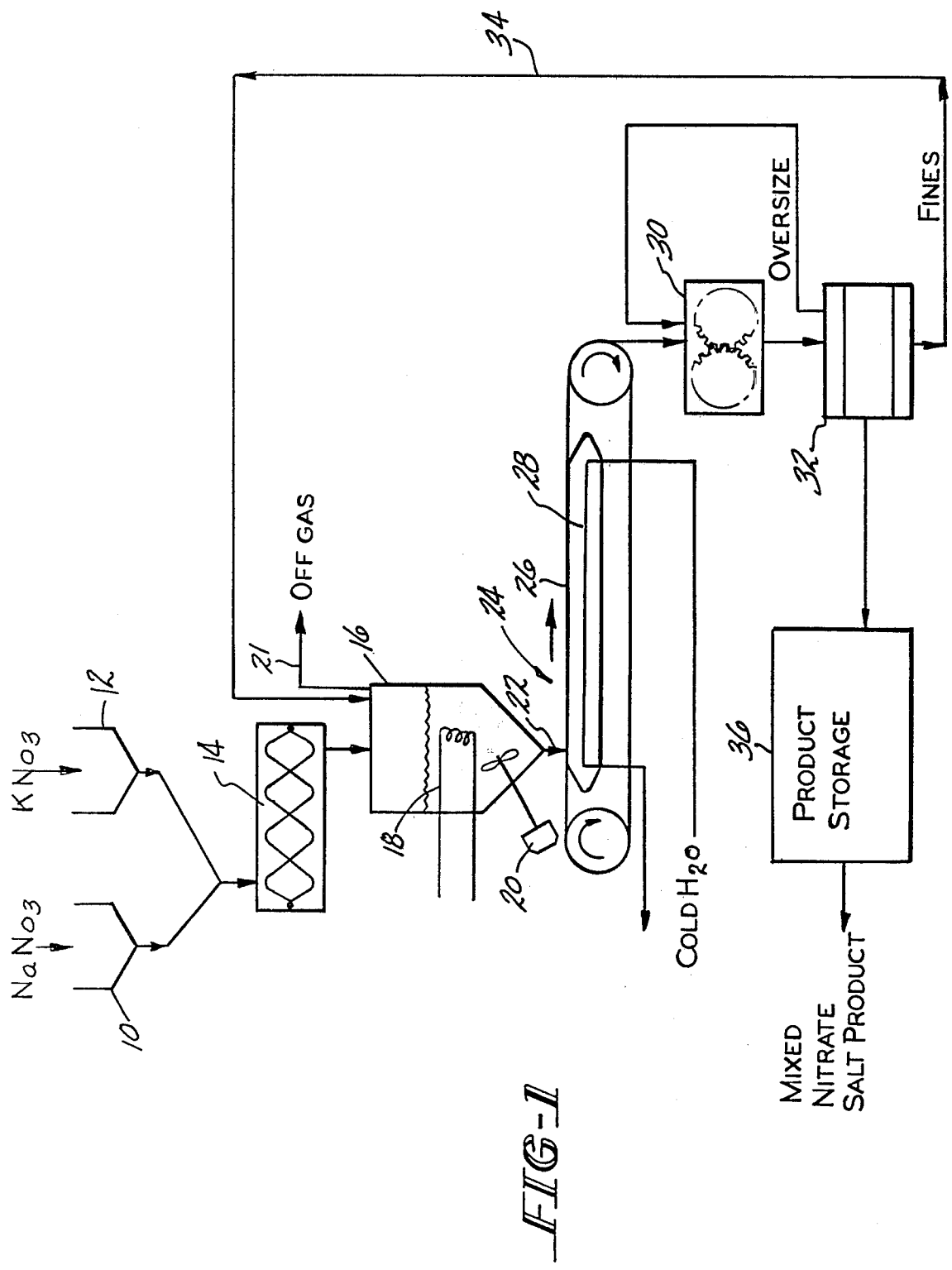

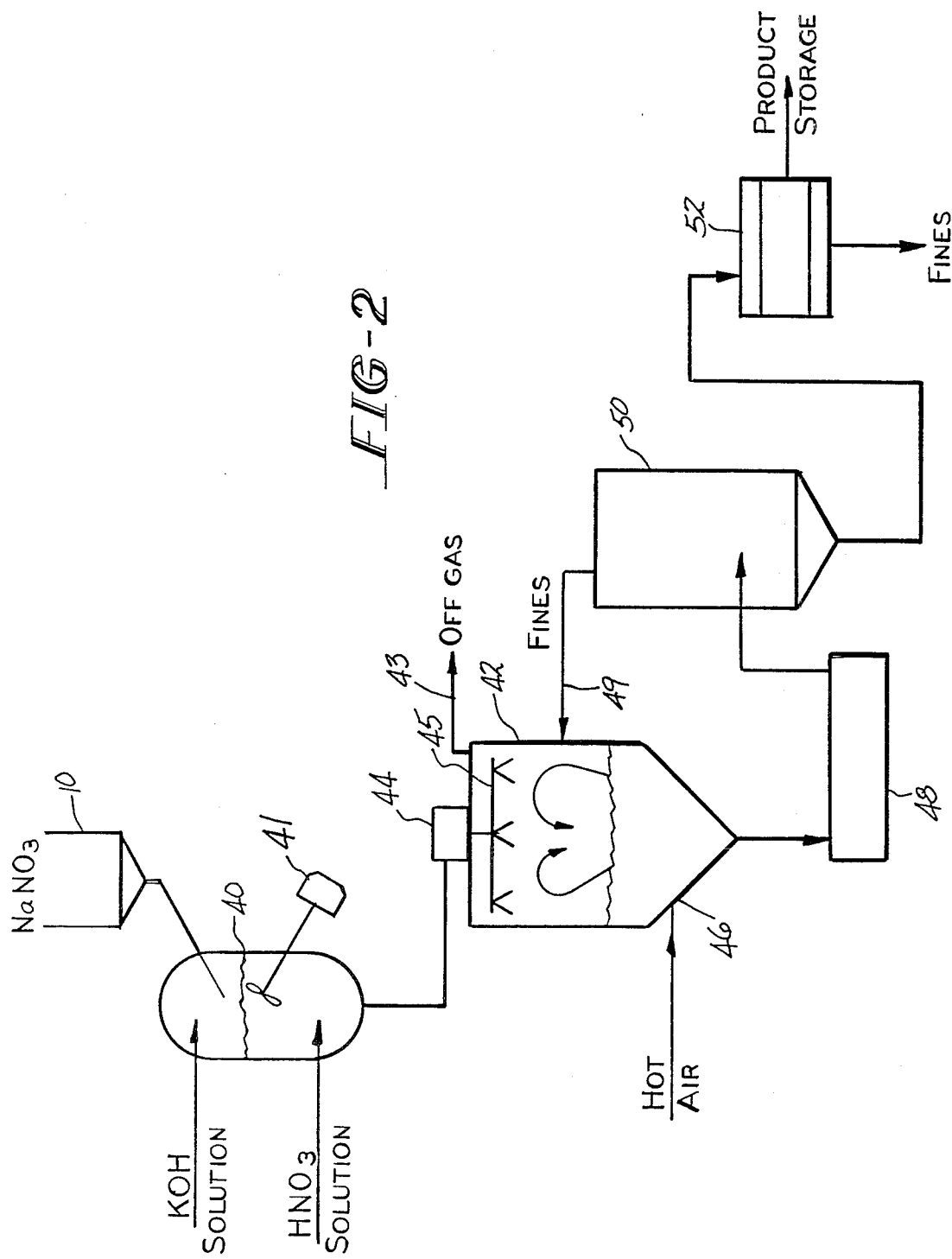

MIXED NITRATE SALT HEAT TRANSFER MEDIUM AND PROCESS FOR PROVIDING THE SAME

FIELD OF THE INVENTION

This invention relates to the production of a non-friable, dried salt product and more particularly to the production of fused or agglomerated mixed salt particles comprised of sodium nitrate and potassium nitrate for use as a heat transfer and thermal storage medium.

BACKGROUND OF THE INVENTION

As a result of the energy crisis, there has been a considerable interest in developing alternative sources of energy for electric power stations to replace increasingly expensive imported petroleum products. One method which has generated considerable interest is the use of solar energy as a heat source for generating steam for electric power generation. In this process, it is necessary to concentrate the energy coming from the sun to heat a liquid which absorbs the heat and carries it to the generator. In relatively low power hot water or space heating systems, the liquid is water which is either pumped or fed by gravity through a plurality of solar panels to a storage medium, generally crushed rock, from which the heat is extracted for subsequent use. Such systems are beginning to find wide use in home heating and hot water applications, particularly in the Southwest where long periods of sunlight are the norm. However, when it is desired to use solar energy as a source for large scale electric power application, the relatively low boiling point of water makes its use unsatisfactory unless high pressure components are used throughout the system. It would be much better if a low pressure system could be used.

One type of thermal transfer medium which has evoked considerable interest is mixed salts having a relatively large spread between their melting and boiling points. Many of these have relatively high specific heats so that they are able to absorb large quantities of thermal energy per degree of temperature rise more efficiently than many types of metallic or organic heat transfer media. When liquified, these salts can be readily pumped to and through a "power tower" or similar heat concentration system to obtain a large quantity of sensible heat which is then utilized in a more-or-less conventional steam generator/turbine system for electric power generation. For such use, a number of salt mixtures are known which are stable at temperatures of up to about 900° F.

One particular salt mixture which has been proposed as a practical thermal storage medium for these purposes is a eutectic mixture of sodium nitrate and potassium nitrate. Such a mixture meets the above-stated criteria in that its melting point is relatively low, being about 400° F. and, when molten, is both quite fluid and, most critically, stable at temperatures of up to about 1200° F. Furthermore, the eutectic composition, unlike those of most metallic alloys, is quite broad, ranging from about 30% to about 70% by weight of sodium nitrate in the mix. Thus, tolerance to minor changes in the sodium/potassium ratio is extremely high. Further, the raw materials are widely available and relatively low in cost.

However, to avoid potential operating problems with stress corrosion and line pluggage, it is necessary that both components of the mix be essentially free of chloride and high melting point carbonate, oxide and sulfate impurities, with a combined maximum total purity level of about 0.7% being considered acceptable and with the chloride level being no more than about 0.2%. Further, a number of problems have arisen in producing such a mixed salt product in a form which allows the safe and easy shipment of the large quantities required to the relatively remote areas, such as those in the Southwest, wherein many large solar power stations have been proposed. It has been found that unless the mixed salt is produced in a relatively non-friable form, essentially free of fines (less than about 50 mesh), it is quite sensitive to moisture level in excess of about 0.5%. Levels higher than this tend to cause the salt to set up and cake quite badly. In such condition, it cannot be shipped in large quantities, specifically in covered railroad hopper cars and barges, without encountering significant problems, first in unloading the material and then in crushing it, after long-term storage, prior to charging it into the power system. This is not an unusual problem and is frequently encountered in the shipment of many bulk chemicals. However, solutions developed such as bagging or drumming almost invariably add both to production and shipping costs.

What is needed is a method for producing a dry homogeneous eutectic blend of sodium nitrate and potassium nitrate which is non-friable, free-flowing and relatively insensitive to moisture when shipped and stored in bulk quantities.

BRIEF SUMMARY OF THE INVENTION

The principal object of the present invention is to produce particles of a non-friable, eutectic mixture of sodium nitrate and potassium nitrate for use as a heat transfer and thermal storage medium for solar power stations.

It is a further object of the present invention to produce a mixed nitrate salt product having between about 70% and about 30% by weight sodium nitrate and between about 30% and about 70% by weight potassium nitrate, and a maximum combined chloride, sulfate, oxide and carbonate impurity level of about 0.7% by weight with the maximum acceptable chloride content being about 0.2%.

Still another object of the present invention is to produce particles of a non-friable, eutectic mixture of sodium nitrate and potassium nitrate for use as a heat transfer and thermal storage medium for solar power stations, said particles having been produced by a method comprising the steps of:

(a) admixing granular $NaNO_3$ and granular $KNO_3$ to produce a dry blended substantially homogeneous salt mix;

(b) heating said salt mix while agitating it until it fuses to form a molten mass;

(c) pouring said molten mass onto a chilled surface to form a solid, amorphous homogeneous sheet;

(d) breaking up said sheet to form said particles; and (e) screening said particles to separate out a product having a size between about −5 mesh and about +30 mesh.

Still another object of the present invention is to produce a non-friable, dried salt particles for use as a heat transfer and thermal storage medium for solar power stations, said particles having been produced by a method comprising the steps of:

(a) forming an aqueous solution of sodium nitrate and potassium nitrate, said solution having a total salt content of between about 60% and about 75% combined salt by weight at a temperature of between about 95° C. and about 120° C.;

(b) spraying said aqueous solution into a drying chamber and contacting said sprayed solution with a heated gas flowing through said chamber to form a dried fine particulate product, said fine particulate product being fluidized by said flowing gas;

(c) agglomerating said fluidized fine particulate product by contacting it with additional aqueous solution which is being sprayed into said drying chamber for a time sufficient to form said particles; and (d) classifying said particles to screen out undersized and oversized particles and recover a final product having a size range between about $-5$ mesh and about $+30$ mesh.

Other objects of the invention will become apparent from the following description and the appended claims.

BRIEF DESCRIPTION OF THE DRAWINGS

FIG. 1 is a flow diagram for a process wherein a mixed sodium nitrate/potassium nitrate salt product is produced by shock chilling a molten mixed stream.

FIG. 2 is a flow diagram for a process wherein a mixed sodium nitrate/potassium nitrate salt product is produced by a spray granulation of mixed salt solution.

DETAILED DESCRIPTION OF THE INVENTION

The present invention is adapted to produce particles of a non-friable, fine-free particulate eutectic mixture of sodium nitrate and potassium nitrate.

Referring now to FIG. 1, a flow diagram of one embodiment producing a flaked product is disclosed. In this, dry sodium nitrate from storage hopper 10 and dry potassium nitrate from storage hopper 12 are first mixed and blended in ribbon blender 14. To be satisfactory, the raw materials used must either be quite pure themselves or be capable of being purified as a part of the processing involved. For heat transfer processes, the combined total impurity level, particularly of high melting point carbonates, sulfates and oxides, should be no more than about 0.5% by weight. Furthermore, the combined chloride content in these materials must also be kept very low. This is necessary to avoid potential problems with stress corrosion cracking with any stainless steel in the power system components used. The maximum chloride content considered safe for this use is below about 0.2% by weight.

Bulk raw materials for this process can be obtained from a variety of sources. One, for example, is "Industrial Grade", Chile saltpeter, which has about 97.5% $NaNO_3$, 1.2% $KNO_3$ and a nominal chloride content of about 0.6% and can be recrystallized to reduce the $Cl^-$ level to an acceptable level of <0.2%. Another is "Synthetic" $NaNO_3$ which is produced by neutralizing either sodium hydroxide or sodium carbonate with $HNO_3$. Such a product, when produced from caustic produced on either a mercury or membrane chlor-alkali cell, is known to have very low levels of chloride and sulfate impurities. Also, when the solution PH is kept at about a level of 5.5–6.5, oxides and carbonates are effectively removed. Further, the exothermic nature of the neutralization reaction significantly lowers the thermal requirements to evaporate the water and produce a dry salt product. Similarly, potassium nitrate can be prepared by recrystallizing naturally occurring sylvanite or carnalite ores with $NaNO_3$ or by neutralizing a pure potassium hydroxide solution with nitric acid.

While neutralized hydroxide solutions, which tend to produce purer starting salt products, are preferred, the economics of plant scale operation and system will determine which particular sources of nitrate materials will be used.

Regardless of which method or methods are used to produce them, both nitrate salts should be kept dry prior to use. For free-flowing into and out of the storage hoppers, they should have a particle size of between about $-10$ and about $+30$ mesh and a moisture content of under about 0.5%. While any ratio within the eutectic range for sodium nitrate to potassium nitrate may be blended, a blend comprised of between about 65–55% $NaNO_3$ and about 35–45% $KNO_3$ by weight is preferred.

The now blended materials are charged into melter 16. The temperature reached within melter 16 is not particularly critical so long as it exceeds a eutectic melting point of about 220° C. However, for practical purposes, both from the heating and subsequent cooling standpoints, it should not go much higher than about 300° C. and preferably not above about 245° C. While the individual raw materials can be added separately to melter 16, blending them beforehand is found to reduce the thermal input required to produce a molten product. This tendency is further promoted by stirring means 20 which both speeds up the wetting and therefore melting of the incoming nitrate salt grains and improves product uniformity by stirring the melt. Moisture and any other gaseous products generated during this operation are removed by off-gas vent 21.

The now molten mixture is continuously discharged through outlet 22 onto shock chilling table 24. This comprises crystallizing conveyor 26 which has a continuous steel belt immediately underneath of which is water cooler 28. The travel rate of advance for the belt is coordinated with the pour rate of the molten salt so that a layer thickness of between about 0.20" and about 1.25" and preferably about 0.25" to about 0.75" thick is formed. Such a size range provides for reasonably quick cooling and produces a product with good crushing characteristics in the final processing. The water flow through cooler 28 is controlled so that the salt layer quickly solidifies before any separation of the salts can occur. Rather, it forms an amorphous, substantially homogeneous sheet, which by the time it advances to the end of conveyor 26, is fairly rigid and sturdy.

A flat chilling unit is preferred for this work so as to produce a solid product with the preferred thickness. Because of the relatively high fluidity of the molten salt product, rotary drum chilling units tend not to be able to do this. Further, with a flat chilling unit, problems with "leakage" of the molten salt off the moving belt surface are essentially nil. With currently available shock chilling units as described above, production rates of between about 50 and about 75 tons/day can easily be achieved.

The now solidified sheet of salt product drops into crusher grinder 30 in the form of large flat pieces of sheet or "flakes" which have broken off, more or less under their own weight, from the advancing solidified sheet on conveyor 26. In grinder 30, these pieces are reduced in size and conveyed to screening means 32 from which a particulate product in the mesh size range of between about −5 to about +30 and having a relative crushing index of about 0.06 is recovered. Such a number is indicative that the product will not chip, crack or otherwise crumble during storage and shipment so that subsequent formation of unacceptable fines is minimized. The larger this number, the greater chance to break up. Oversized material is generally reground while undersized material is recycled, via transport means 34, back to melter 16. The screened material within the acceptable size range is sent to bulk storage 36 from which it is subsequently loaded into bulk transportation means (not shown) for shipment to the user. The material in this form can be drummed or bagged and is readily shipped in bulk form either in pneumatic tractor trailers, covered rail hopper cars or, where feasible, in barges.

Since this process involves no exposure to process induced sources of contamination, the crushed particles are still within acceptable limits for chloride, sulfate, oxide and carbonate impurities. Further, the hard glass-like surfaces of the crushed particles effectively inhibit $CO_2$ and most particularly moisture pickup even after prolonged exposure to air.

Thus, it is found that this material, if protected from exposure to liquid water can be easily and quickly discharged both into and out of said bulk transportation means for use as a heat transfer medium in a power station without the need for special drying techniques or other further treatment.

Referring now to FIG. 2, a second embodiment of the present invention is disclosed for producing a spherical granulated mixed nitrate salt.

In this embodiment, sodium nitrate and potassium nitrate are combined to form a mixed concentrated precursor solution. While the raw material sources for this procedure may be the same as for the dry blending method described above, they are used in the form of aqueous solutions. This tends to simplify many of the initial material handling and storage problems which are normally encountered with dry bulk products.

Potassium nitrate is preferably formed in reactor 40 by the controlled neutralization of, for example, a concentrated KOH solution with nitric acid provided it can meet the impurity level requirements. At present, KOH of the requisite purity is normally produced by electrolysis of a KCl brine in a membrane cell such as that described by Lynch in U.S. Pat. No. 4,253,923. This produces a very pure, 35% by weight KOH solution which can be readily shipped by pipeline, tank car, or barge to the mixed nitrate production facility.

As shown in FIG. 2, the precursor mixed nitrate solution is prepared by adding solid sodium nitrate from storage hopper 10 to the freshly neutralized potassium hydroxide solution in reactor 40. This solution is quite hot due to the highly exothermic nature of the neutralization reaction so that the solid $NaNO_3$ rapidly dissolves to form the $NaNO_3$: $KNO_3$ mixture required. In general, the neutralization step is carried out at a pH of between about 6.2 and about 6.7, i.e., to be just slightly acidic. Such a procedure is effective in destroying any carbonate contamination which may have formed during the shipping and blending steps.

As with $KNO_3$, $NaNO_3$ may also be produced by neutralizing a very pure membrane or mercury cell caustic soda solution or by neutralization of $Na_2CO_3$ with nitric acid; the resulting $NaNO_3$ solution then being added directly to the neutralized $KNO_3$ solution to form the final nitrate solution.

It is also possible to directly produce almost any desired composition for a nitrate salt mixture by the electrolysis of a mixed sodium and potassium chloride brine in a membrane cell. This method offers the particular advantage that, when one of the recently developed composite mixed sulfonate/carboxylate membranes is used, the output product is often considerably "richer" in potassium relative to sodium than was the salt in the starting brine. Thus, it is possible to start with many lower grade materials, such as are found in many lake brines in the western U.S., and still produce directly a satisfactory mixture of NaOH/KOH in solution having between about 25% and about 35% by weight concentration. When subsequently neutralized with nitric acid, this produces the final mixed nitrate solution.

The specific solution procedures used will depend upon both the overall economics of the process and the relative availability of the different starting materials. For effective treatment in a conventional granulation system, a total concentration of between about 60% and about 75% by weight is preferred for the aqueous solution.

However the mixed nitrate aqueous solution is produced; it is brought to a temperature of between about 95° C. and about 120° C. and then pumped into fluidized bed spray granulator 42 through inlet 44 to atomizer nozzles 45 to produce a relatively fine spray. At the same time, a stream of a heated gaseous medium, preferably air at a temperature of between about 160° C. and about 190° C. is admitted near the bottom of granulator 42 through air inlet 46. In such a system, the falling spray droplets quickly dehydrate by contact with the rising hot gas to form fine seed particles which, when in sufficient quantity, form a fluidized bed within the body of granulator 42. For initial operation, such a bed can be formed by either charging a finely ground dry blended/melted product or by spray drying a mixed nitrate salt solution to produce a mixed product "flour" in the size range of about 0.3 to about 1 mm in diameter. Additional solution is then sprayed into the granulator, with the result that the agitated seed particles agglomerate so as to form dense, relatively hard spherical particles, the size of which is a function of both the air and solution temperatures and feed rates and the droplet size produced by the atomizer nozzles 45. For the mixed nitrate product of interest, the size range of the finished dry granules is between about −5 mesh and about +30 mesh. In commercially sized reactors, it normally takes about 2 minutes to produce such a product size with steam and other off gases being vented through gas outlet 43.

The dried granulated product from granulator 42 is first cooled in cooler 48 and then roughly classified in cyclone separator 50, primarily to separate out fines, i.e., particles less than about 100 mesh in size. These are returned to granulator 42 via line 49 to act as fresh seed material therein. When necessary, they can also be redissolved in reactor 40 to provide additional feedstock solution.

The classified product from separator 50 is next fed into screen/means unit 52 wherein a final product having a particle size in the range of about −5 mesh to about +30 mesh is recovered and sent to product storage. Oversized material is crushed to provide additional final product, while undersized material is recycled back into granulator 42 as seed material. When produced by this method, the spherical particles have a crushing index of between about 0.09 and about 0.13 and show both exceptionally good flow characteristics and resistance to fines formation. The final product moisture content is generally between about 0.05% and about 0.10%.

It is understood that other methods of agglomeration may be equally effective insofar as forming the salt particles of interest are concerned and the use of such methods is within the ambit of this invention. One method, widely used in industry, involves spraying the nitrate aqueous solution into a horizontally rotating drum dryer containing suitable seed material. The solution of the drum causes the agglomerate to cascade through the falling spray droplets to form finished dry product granules of the proper size.

The following examples are given to illustrate the invention and are not deemed to be limiting thereof. All parts and percentages are by weight unless otherwise specified.

EXAMPLE 1

Sixty grams of granulated "synthetic" sodium nitrate having a $NaNO_3$ content of about 99.32% and a combined chloride, sulfate, and carbonate content of about 0.33% by weight was dry blended with 40 grams of granular potassium nitrate having an analysis of about 99.38% $KNO_3$, 0.41% $NaNO_3$ and 0.18% combined chloride, sulfate and carbonate. The mixed salt was then placed in a stainless steel beaker and heated to about 290° C. while being stirred.

The mixed salts melted to form a relatively low viscosity fluid which, after being stirred to assure product uniformity, was poured onto a water cooled stationary flat chilling table whereupon the liquid solidified to form a sheet of solid mixed nitrate salt about 0.25" thick. After cooling, the sheet was removed from the chilling table and, after being broken into smaller individual pieces by an impacter, was ground to a product having a screen size in the range of between about 5 and about 10 mesh. Visual examination of the product particles showed them to be quite homogeneous with no evidence of stratification or salt separation. Analysis of the product showed to melt at a temperature of about 222° C. and to have about 58.7% $NaNO_3$, 40.3% $KNO_3$, 44 ppm $Cl^-$, <0.01% $CO_3^=$, <3 ppm $SO_4^=$, less than 0.05% moisture and a crushing index of 0.06. The ground product was very hard and showed good flow characteristics and good resistance to the formation of fines during normal bulk product handling operations.

EXAMPLE 2

A 65% by weight solution of a dry blended mix prepared as in Example 1 was spray dried at about 120° C. to produce an approximately 30-micron size seed material. This was charged into a Niro Atomizer lab scale spray granulator having about a 6" diameter to form a bed which was fluidized by a stream of 175° C. hot air, at a flow velocity of about 1 m/sec., after which additional blended solution having about a 60% total salt content was sprayed into the granulator until fluidization of the bed could no longer be maintained. This took about 16 minutes in the system used, at which time, it was found that most of the seed particles had agglomerated to form hard spherical particles of between about 1 mm (18 mesh) and about 4 mm (5 mesh) in diameter. Examination of the product showed it to have a melting point of about 222° C. and an analysis of about 62% $NaNO_3$, 38% $KNO_3$, about 100 ppm combined $Cl^-$, $CO_3^=$ and $SO_4^=$, less than 0.05% moisture and a relative crushing index of 0.09 to 0.13.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A process for preparing particles of a non-friable, eutectic mixture of sodium nitrate and potassium nitrate for use as a heat transfer and thermal storage medium for solar power stations comprising steps of:
    (a) preparing a fluid mixture of between about 70% and about 30% by weight sodium nitrate and about 30% and about 70% by weight potassium nitrate, wherein said fluid mixture has a combined level of sulfates, oxides, carbonates and chlorides of no more than about 0.7% by weight and with the chloride being no more than about 0.2% by weight;
    (b) granulating said fluid mixture by a process selected from the group consisting of shock chilling and spray graining to form substantially homogeneous particles of said mixture; and
    (c) recovering a salt product comprised of particles having a predetermined mesh size.

2. The process of claim 1 wherein said fluid mixture is formed by:
    (a) admixing granular $NaNO_3$ and granular $KNO_3$ to produce a dry blended substantially homogeneous salt mix; and
    (b) heating said salt mix while agitating it until it fuses to form a molten mass.

3. The process of claim 2 wherein said salt mix is heated to a temperature in the range of from about 220° C. to about 300° C.

4. The process of claim 3 wherein said salt mix is heated to a temperature in the range of from about 220° C. to about 245° C.

5. The process of claim 2 wherein said particles are formed by a shock chilling process which comprises:
    (a) pouring said molten mass onto a chilled surface to form a solid, amorphous homogeneous sheet; and
    (b) breaking up said sheet to form said particles.

6. The process of claim 5 wherein said solid sheet is between about 0.20" and about 1.25" thick.

7. The process of claim 5 wherein said solid sheet is between about 0.25" and about 0.75" thick.

8. The process of claim 1 wherein said fluid mixture is an aqueous solution of sodium nitrate and potassium nitrate.

9. The process of claim 8 wherein said aqueous solution has a total salt concentration of between about 60% and about 75% by weight.

10. The process of claim 8 wherein said aqueous solution is at a temperature of between about 95° C. and about 120° C.

11. The process of claim 8 wherein said granulation step is carried out by spray graining in a process which comprises:
    (a) spraying said aqueous solution into a drying chamber and contacting said sprayed solution with a heated gas flowing through said chamber to form a dried fine particulate product, said fine particulate product being fluidized by said flowing gas; and (b) agglomerating said fluidized fine particulate product by contacting it with additional aqueous solution which is being sprayed into said drying chamber for a time sufficient to form agglomerated particles of a predetermined mesh size.

12. The process of claim 10 wherein said heated gas is at a temperature of between about 160° C. and about 200° C.

13. The process of claim 5 or claim 11 wherein said recovery step comprises screening said agglomerated particles to separate out salt particles having an acceptable size range from those which are oversized or undersized.

14. The process of claim 13 wherein said acceptable salt particles are in the range of between about −5 mesh to about +30 mesh.

15. The process of claim 13 wherein oversized particles of said mix are crushed and rescreened.

16. The process of claim 13 wherein undersized particles of said mix are recycled to form a part of the feedstock for said fluid mixture.

17. The process of claim 13 wherein said salt particles are comprised of between about 65% and about 55% by weight sodium nitrate and about 35% to about 45% by weight potassium nitrate.

18. A process for making non-friable, dried salt particles for use as a heat transfer medium for solar power stations, said salt particles being a eutectic mixture of between about 70% and about 30% by weight sodium nitrate and between about 30% and about 70% by weight potassium nitrate, said particles being further characterized by having a maximum combined chloride, sulfate, oxide and carbonate content of about 0.7% by weight with the maximum chloride content being about 0.2%, said salt particles having been produced by a method comprising the steps of:
(a) admixing granular NaNO$_3$ and granular KNO$_3$ to produce a dry blended substantially homogeneous salt mix;
(b) heating said salt mix to a temperature in the range of about 220° C. to about 300° C. while agitating it until it fuses to form a molten mass;
(c) pouring said molten mass onto a chilled surface at a rate sufficient to form a solid, amorphous homogeneous sheet of between about 0.20″ and about 1.25″ thick;
(d) breaking up said sheet to form said particles; and
(e) classifying said particles to recover a final product.

19. A process for making non-friable, dried salt particles for use as a heat transfer medium for solar power stations, said salt particles being a eutectic mixture of between about 70% and about 30% by weight sodium nitrate and between about 30% and about 70% by weight potassium nitrate, said particles being further characterized by having a maximum combined chloride, sulfate, oxide and carbonate content of about 0.7% by weight with the maximum chloride content being about 0.2%, said salt particles having been produced by a method comprising the steps of:
(a) forming an aqueous solution of sodium nitrate and potassium nitrate, said solution having a total salt content of between about 60% and about 75% combined salt by weight at a temperature of between about 95° C. and about 120° C.;
(b) spraying said aqueous solution into a drying chamber and contacting said sprayed solution with a heated gas flowing through said chamber to form a dried fine particulate product, said fine particulate product being fluidized by said flowing gas;
(c) agglomerating said fluidized fine particulate product by contacting it with additional aqueous solution which is being sprayed into said drying chamber for a time sufficient to form said particles; and
(d) classifying said particles to recover a final product.

20. The process of claim 18 or 19 wherein said acceptable salt particles are in the range of between about −5 mesh to about +30 mesh.

21. The process of claim 20 wherein oversized particles of said mix in size are crushed and reclassified.

22. The process of claim 20 wherein undersized particles of said mix are recycled to form a part of the feedstock for said fluid mixture.

23. Non-friable, dried salt particles for use as a heat transfer medium for solar power stations, said salt particles being a eutectic mixture of between about 70% and about 30% by weight sodium nitrate and between about 30% and about 70% by weight potassium nitrate, said particles being further characterized by having a maximum combined chloride, sulfate, oxide and carbonate content of about 0.7% by weight with the maximum chloride content being about 0.2%.

24. The salt product of claim 23 wherein said salt particles are comprised of between about 65% and about 55% by weight sodium nitrate and about 35% to about 45% by weight potassium nitrate.

25. The salt product of claim 23 wherein said acceptable salt particles are in the range of between about −5 mesh to about +30 mesh.

* * * * *